E. C. DICEY.
SAW-MILL DOG.
No. 173,451.  Patented Feb. 15, 1876.
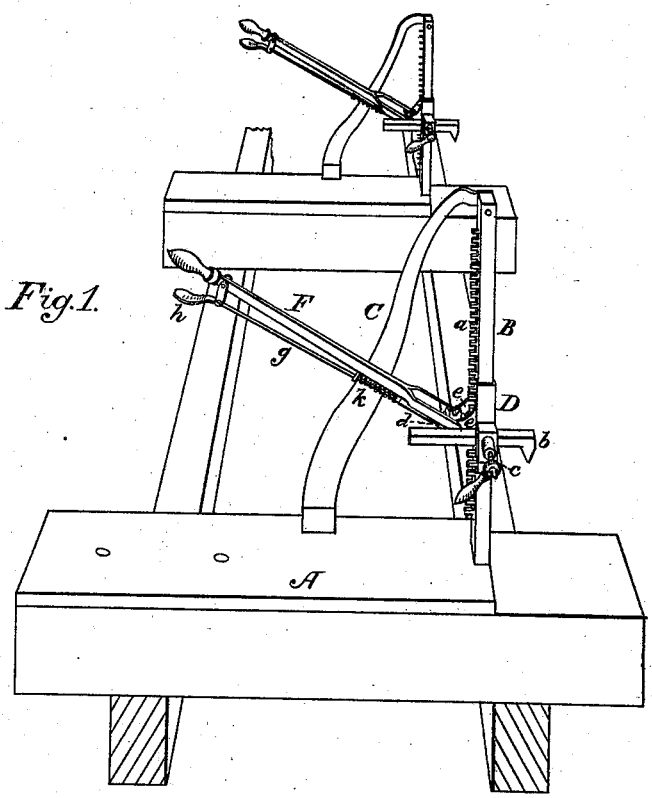
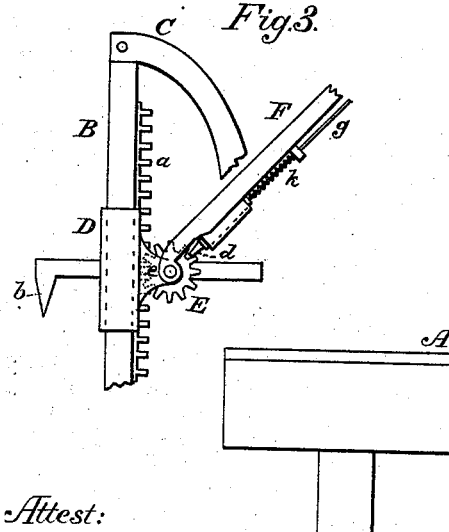
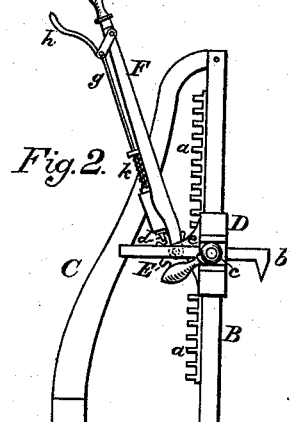
Attest:
H. H. Schott
N. A. Lyon
Inventor:
E. C. Dicey.

UNITED STATES PATENT OFFICE.

ELMER C. DICEY, OF GRAND HAVEN, MICHIGAN.

IMPROVEMENT IN SAW-MILL DOGS.

Specification forming part of Letters Patent No. 173,451, dated February 15, 1876; application filed February 4, 1876.

*To all whom it may concern:*

Be it known that I, ELMER C. DICEY, of the city of Grand Haven, county of Ottawa and State of Michigan, have invented certain new and useful Improvements in Saw-Mill Dogs, of which the following is such a clear and exact description as will enable others skilled in the art to which it pertains to make and use the same, reference being had to the accompanying drawings and to the letters of reference marked thereon, similar letters indicating corresponding parts in the different figures.

The object of this invention is to render the dogs used upon the head-blocks of saw-mills for the purpose of holding the log in position during the operation of sawing easily and quickly adjustable to logs of varying diameters, and to furnish a dog that shall hold firmly in hard or frozen wood; and it consists in the construction and arrangement of the parts, as will be hereinafter fully described and then specifically pointed out in the claim.

Figure 1 is a perspective view of a log-carriage, with its head-blocks and dogs as arranged for use. Fig. 2 presents an end view of the carriage and side view of one of the head-blocks and its accompanying dog. Fig. 3 shows the opposite side of the head-block and dog to that represented in Fig. 2.

The saw-mill carriage may be constructed in any of the well-known forms in common use, as may also the lower part of the head-blocks and devices for moving the standards.

A represents the movable base, to which the vertical standard B is secured, or the two may be formed of the same piece of metal. This standard is of rectangular sections, and provided upon its back side with a series of teeth, *a*, into which gears a pinion, used in operating the dog. From the upper end of the standard to the base A extends a brace, C, which sustains it in its vertical position against the weight and blows it may receive from the logs when they are rolled upon the carriage and during their further manipulation. A sliding sleeve, D, is placed upon the standards and so constructed as to embrace the latter, as well as to receive, through a suitable mortise in one side, the adjustable dog *b*, which is secured at any desired point by means of a set-screw, *c*. Attached to the rear of the sleeve are two projecting lugs, *e e*, between which revolves the pinion E, upon a pin passing through the lugs. This pinion gears into the teeth *a* upon the standard B, and, when revolved, carries the sleeve and dog with it. A lever, F, is pivoted to the lugs by the same pin that supports the pinion in position. This lever extends toward the rear of the head-block, so as to be in convenient position for the operator, who stands upon a platform at the back of the carriage. The lever is also provided with a sliding pawl, *d*, upon its under side, which engages with the teeth of the pinion. This pawl is connected by means of the rod *g* with a handle, *h*, pivoted to the lever F in such a manner that when the lever is grasped the hand may inclose the handle *h* and withdraw the pawl from the teeth of the pinion, allowing the sleeve and dog to slide freely up or down upon the standard B. A spring, *k*, serves to force back the pawl whenever it is released by the operator, thus causing it to engage with the pinion, so that any vertical movement of the lever shall cause the pinion to revolve, thus carrying the sleeve and dog up or down the standard as the lever is raised or lowered.

I am aware that a horizontally-adjustable dog attached to a vertical slide and employed for the purpose of holding logs upon the log-carriage of a saw-mill has long been in use, and therefore only claim such in combination with the other parts used for operating them.

Having thus described my invention, I claim as new, and desire to secure by Letters Patent, the following:

1. The toothed standard B, in combination with the sleeve D, adjustable dog *b*, pinion E, and lever F, with its sliding pawl *d*, substantially as and for the purpose specified.

2. The lever F, handle *h*, rod *g*, pawl *d*, and spring *k*, in combination with the pinion E, and vertically-adjustable sleeve, as set forth.

In testimony whereof I have hereunto affixed my signature, this second day of February, 1876, in presence of two witnesses.

E. C. DICEY.

Witnesses:
D. W. HOWARD,
EDWD. T. BENTON.